Feb. 23, 1971 D. C. TABLER ET AL 3,565,963
PROCESS FOR THE MANUFACTURE OF HIGH PURITY CYCLOPENTENE
Filed Dec. 22, 1969
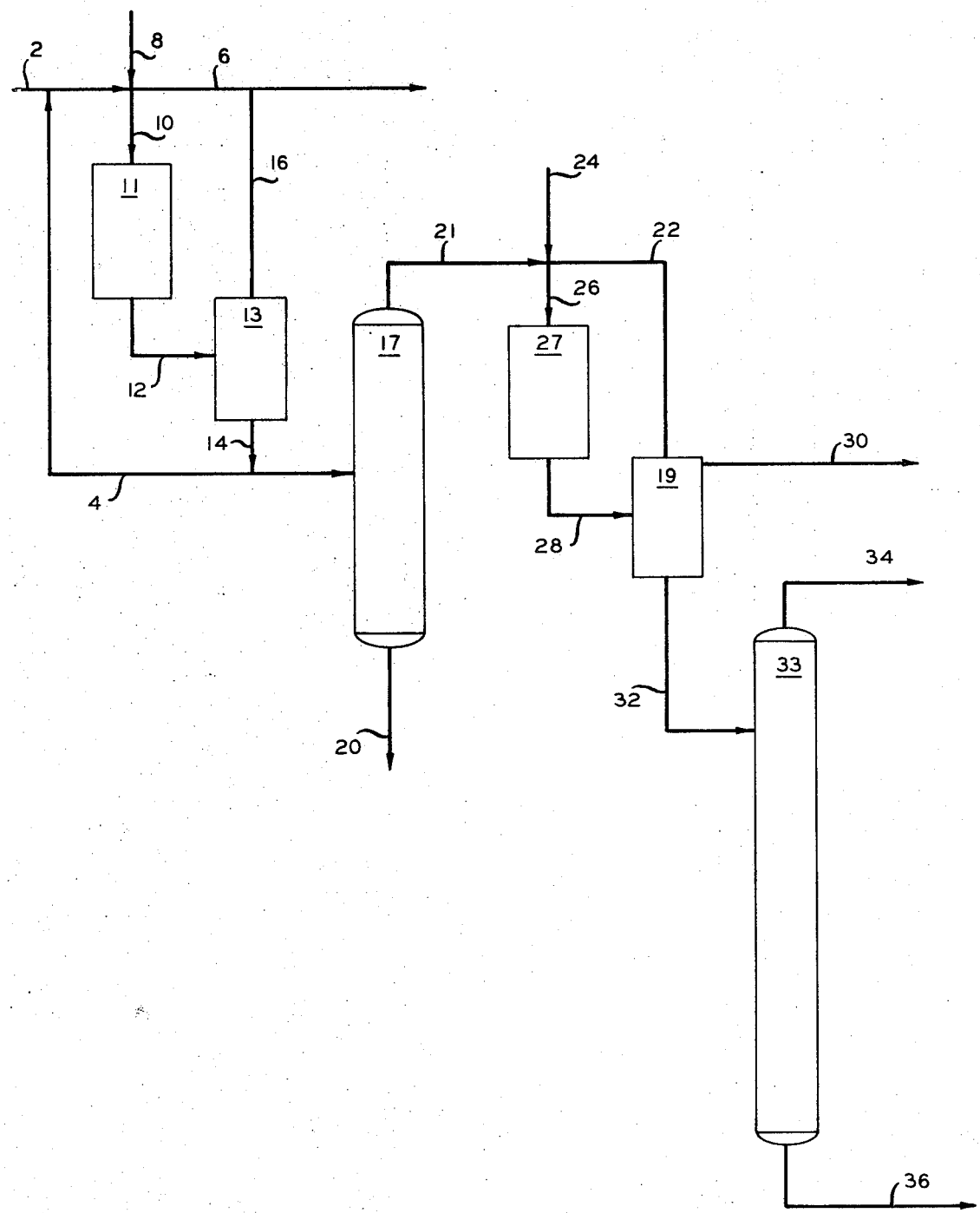
INVENTORS
D. C. TABLER
M. M. JOHNSON
BY *Young & Quigg*
ATTORNEYS United States Patent Office 3,565,963
Patented Feb. 23, 1971

3,565,963
PROCESS FOR THE MANUFACTURE OF HIGH PURITY CYCLOPENTENE
Donald C. Tabler and Marvin M. Johnson, Bartlesville, Okla., assignors to Phillips Petroleum Company, a corporation of Delaware
Filed Dec. 22, 1969, Ser. No. 887,286
Int. Cl. C07c 3/00
U.S. Cl. 260—666    3 Claims

ABSTRACT OF THE DISCLOSURE

A two-stage hydrogenation and separation process of a cyclopentadiene source for the manufacture of a substantially diolefin free, high purity cyclopentene suitable for polymerizing.

This invention relates to a process for the manufacture of high purity cyclopentene. In one aspect the invention relates to manufacturing a high purity cyclopentene suitable for polymerization.

The art suggests production of cyclopentene from cyclopentane as well as from cyclopentadiene or dicyclopentadiene. Cyclopentadiene being commercially available as a by-product of the petroleum industry has been converted into cyclopentene by being subjected to a selective hydrogenation process. Even though cyclopentene of high purity has been achieved by the art, problems still exist since small amounts of diolefins remain as a contaminant in the partially purified cyclopentene. The remaining impurities of diolefins prevent such partially purified cyclopentene streams from being used in certain polymerization procedures.

It is an object of this invention to manufacture a substantially diolefin free, high purity cyclopentene.

It is another object of this invention to manufacture a cyclopentene of polymerization grade purity.

Heretofore, none of the methods available in the art have been able to provide a high purity cyclopentene from a cyclopentadiene stream without the remaining diolefins resulting in an undesired contaminate concentrate. The contaminates consist essentially of piperylenes and any unreacted cyclopentadiene since they both have similar boiling points to that of cyclopentene, therefore they concentrate in the cyclopentene when the mixture is distilled. Even though they are present in very small amounts in the partially purified cyclopentene, their removal continues to present a challenge.

We have discovered an improved method for the production of high purity cyclopentene from the cyclopentadienes existing in cracked gasoline or other pyrolysis products such as debutanized aromatic concentrate. Selective hydrogenation of the included cyclopentadiene of these feedstreams by this invention produces a high purity polymerization grade cyclopentene through a two-stage hydrogenation and fractionation process. In the first stage, the majority of the cyclopentadiene is converted to cyclopentene. But the remaining, similar boiling diolefins must be removed from the concentrated cyclopentene by the second stage hydrogenation-fractionation.

The major purpose of the second hydrogenation of the cyclopentene concentrate is to make sure that substantially all of the diolefins are removed. These diolefins, for example, include piperylenes, isoprene and cyclopentadiene. The diolefin removal is measured by the Maleic Anhydride Value which drops from a value of above 35 following one hydrogenation-fractionation stage to a value of less than 2 following the second hydrogenation-fractionation stage of this invention. The Maleic Anhydride Value method provides an estimate of the conjugated diolefins in hydrocarbon mixtures boiling in the gasoline range. The Maleic Anhydride Value may be defined as the number of milligrams of maleic anhydride which reacts with one gram of sample.

We have found that high purity cyclopentene can be produced by the selective hydrogenation of cyclopentadiene contained in a naphtha cracker $C_5$ cut or the liquid by-products of ethylene units. These streams always contain diolefins as example, piperylenes. We have found when working with debutanized aromatic concentrate or a naphtha cracker $C_5$ cut, that a small concentrate of diolefins remains unhydrogenated after the first hydrogenation stage. When the cyclopentene is recovered by distillation the unhydrogenated diolefins, mostly piperylenes, will be concentrated in the cyclopentene stream since they boil at almost the same temperature as does cyclopentene. It is estimated that the cyclopentene stream could contain up to 4 weight percent of these unhydrogenated diolefins following the first stage hydrogenation and fractionation. We have found that if the cyclopentene concentrate is hydrogenated at milder hydrogenation conditions, the diolefins are converted to monoolefins, for example, the piperylenes are converted to n-pentenes, which are easily removed by distillation, correspondingly only a small fraction of the cyclopentene is hydrogenated to cyclopentane under these milder hydrogenation conditions.

Essentially diolefin-free, high purity, cyclopentene is in demand as the monomer for the production of an unsaturated polymer of cyclopentene. Polymerization grade cyclopentene should be at least 99 mol percent pure with a diolefin content of no more than 600 p.p.m. in the concentrated cyclopentene.

A typical debutanized aromatic concentrate stream from an ethylene unit will contain about 10 to 20 percent by weight cyclopentadiene-dicyclopentadiene in an equilibrium state. A typical $C_5$ refinery cut from a naphtha cracker contains about 3 to 7 weight percent cyclopentene and about 25 to 35 weight percent cyclopentadiene. By the application of the method of this invention high purity yields of cyclopentene are achieved. Other petrochemical by-products, for example methylcyclopentene, benzene, toluene and/or xylenes, are also formed.

The method of our invention takes, for example, a fresh feedstock of about 64 weight percent diolefins and dilutes it with recycle olefins to lower the diolefin content to about 10 weight percent in order to limit the heat rise across the first stage reactor to about 80° F. Controlling the first stage heat rise with nonreactive recycle olefins diluent provides for a more satisfactory conversion of cyclopentadiene to cyclopentene with a minimal conversion of cyclopentene to cyclopentane. The mixture is selectively hydrogenated in the vapor phase at about 100 p.s.i.g. and an approximate temperature range of 480 to 560° F. over a nickel sulfide on alumina catalyst. Hydrogen is added to the feed at a rate of one mol of hydrogen per mole of hydrocarbon, giving about 8 mols of hydrogen per mol of diolefin present in order to convert as much of the diolefin contaminate as possible to monoolefins. The cyclopentene stream from the first hydrogenation-fractionation stage contains about 1 weight percent of unreacted diolefins which are essentially removed in the second hydrogenation stage.

The unreacted hydrogen is separated from the first stage hydrogenation effluent by cooling to about 100° F. so that about 50 weight percent of the total effluent condenses. The uncondensed portion consisting of hydrogen, methane and a major portion of hydrocarbons containing five carbon atoms per molecule, is compressed and recycled to the first stage hydrogenation reactor. The higher the first stage hydrogenation operating pressure, the lower the amount of $C_5$ hydrocarbons which will be left in the recycle hydrogen, the lower the recycle compressor-compression ratio and consequently the lower the compression work required. But the higher reactor operating pressure produces a greater formation of polymers so that as a compromise approximately 100 p.s.i.g. is chosen as the first stage inlet pressure. A portion of the recycle hydrogen stream is vented to prevent an undue build-up of methane.

The second stage hydrogenates substantially all the diolefins remaining in the first stage cyclopentene product under milder, more selective hydrogenation conditions. The temperature range of the second hydrogenation stage is approximately 450 to 500° F. with only about a 10° F. temperature rise occurring across the reactor due to the small amount of reactive diolefin present. Under these milder hydrogenation conditions, only a small amount of cyclopentene is converted to cyclopentane. About 1.7 weight percent of the cyclopentene is converted to cyclopentane, but this small conversion is tolerated since substantially complete diolefin conversion occurs.

The broad and preferred operating conditions for the two-stage hydrogenation process of this invention are given in the following table:

Referring to the drawing, a fresh feedstream 2 is mixed with the stage 1 liquid recycle stream 4, the stage 1 vapor recycle stream 6, and the stage 1 makeup hydrogen stream 8 resulting in the stage 1 feedstream 10. The stage 1 feedstream 10 is fed into the hydrogenation reactor 11, producing a stage 1 effluent 12. The stage 1 effluent 12 is separated in separator 13 into a liquid stage 14 and a vapor stage 16. Parts of both the vapor and the liquid phases of the separator 13 are recycled to the reactor 11. The remaining liquid product of the separator 13 is introduced to a fractionation tower 17 producing a top stream separation of concentrated cyclopentene 21 and a bottom stream separation 19 of benzene-toluene concentrate. The concentrated cyclopentene stream 21 is mixed with the stage 2 vapor recycle stream 22 and the stage 2 makeup hydrogen stream 24 resulting in the stage 2 feedstream 26. Stream 26 is introduced to the hydrogenation reactor 27 which produces the stage 2 effluent stream 28. The stage 2 effluent stream 28 is separated in separator 29 which yields a total vapor phase stream 30 and a hydrogenated cyclopentene concentrate stream 32. Stream 32 is fed to the fractionating tower 33 which produces a top stream 34 of high purity cyclopentene and a bottom stream 36 of cyclopentane, methylcyclopentene, and benzene.

EXAMPLE I

A cyclopentadiene containing debutanized aromatic concentrate (D.A.C.) stream from an ethylene unit could produce the following feed, single hydrogenation and two-stage hydrogenation by weight percent yields as shown in Table II.

TABLE II

| | I, D.A.C. feed | II, single hydrogenation | III, two-stage hydrogenation |
|---|---|---|---|
| t-Butene-2 | 0.14 | | 0.0 |
| c-Butene-2 | 0.01 | | 0.0 |
| 2-butene-1 | 0.16 | | 0.0 |
| 2-methylbutene-1 | 0.25 | | 0.0 |
| Pentene-1 | 2.38 | | 0.0 |
| t-Pentene-2 | 0.51 | 0.1 | 0.03 |
| c-Pentene-2 | 0.33 | | 0.03 |
| 1,4-pentadiene | 0.96 | | 0.0 |
| 2-methylbutene-2 | 0.24 | 0.1 | 0.14 |
| Cyclopentane | 0.21 | 0.3 | 2.1 |
| Isoprene | 2.86 | 0.0 | 0.0 |
| Cyclopentene | 2.31 | 99.4 | 97.7 |
| t-Piperylene | 2.38 | 0.1 | 0.0 |
| c-Piperylene | 1.47 | | 0.0 |
| Cyclopentadiene plus dicyclopentadiene | 16.04 | 0.03 | 0.0 |
| Benzene | 51.76 | | 0.0 |
| Toluene | 5.29 | | 0.0 |
| Other components [1] | 12.70 | | 0.0 |

[1] Probably $C_6$ olefins and cycloolefins.

EXAMPLE II

A $C_5$ cut from a naphtha cracker containing about 3 to 7 weight percent cyclopentane and 25 to 35 weight percent cyclopentadiene could produce the following feedstream material balance in pounds per hour as shown in Table II.

TABLE I

| | Operating conditions in the first reactor | | Operating conditions in the second reactor | | Catalyst composition | |
|---|---|---|---|---|---|---|
| | Broad | Preferred | Broad | Preferred | Broad | Preferred |
| Pressure, p.s.i.g | 1–200 | 75–150 | 1–300 | 75–150 | | |
| Catalyst temperature, °F | 300–600 | 480–540 | 400–500 | 450–500 | | |
| Feed rate, LHSV | 0.5–10 | 1–6 | 0.5–10 | 2–8 | | |
| Hydrogen/diolefin mol ratio | 1–15 | 5–10 | 0.5–5 | 1–2 | | |
| Sulfur in feed, p.p.m | 10–5,000 | 25–500 | 10–5,000 | 25–500 | | |
| Percent nickel | | | | | 3–20 | 8–12 |
| Catalyst base | | | | | Activated alumina [1] | Activated alumina |

[1] Calcium aluminate magnesium oxide.

TABLE III

| Stream Number | Stage I | | | | | | | | Stage II | | | | | |
|---|---|---|---|---|---|---|---|---|---|---|---|---|---|---|
| | Fresh feed 2 | Liquid recycle 4 | Vapor recycle 6 | Make-up hydrogen 8 | Feed 10 | Effluent 12 | Flash total liquid 14 | Flash total vapor 16 | Vapor recycle 22 | Make-up hydrogen 24 | Feed 26 | Effluent 28 | Flash total vapor 30 | Cyclopentene product 34 | Heavy pentane product 36 |
| Component: | | | | | | | | | | | | | | | |
| Hydrogen | | 3 | 2,552 | 362 | 2,917 | 2,576 | 4 | 2,572 | 599 | 14 | 614 | 605 | 602 | | |
| Methane | | 109 | 17,254 | 152 | 17,515 | 17,515 | 152 | 17,363 | 1,414 | 6 | 1,463 | 1,463 | 1,421 | | |
| Butenes | 90 | 215 | 642 | | 947 | 946 | 299 | 647 | 58 | | 142 | 142 | 59 | | |
| 3-methylbutene-1 | 35 | 204 | 309 | | 548 | 505 | 284 | 311 | 35 | | 115 | 125 | 35 | | |
| 1,4-pentadiene | 266 | 8 | 11 | | 285 | 23 | 11 | 12 | | | 3 | | | | |
| Isopentane | 1,118 | 2,915 | 3,601 | | 7,634 | 7,684 | 4,054 | 3,630 | 369 | | 1,508 | 1,551 | 371 | | |
| Pentene-1 | 400 | 917 | 1,023 | | 2,340 | 2,306 | 1,275 | 1,032 | 107 | | 465 | 487 | 108 | | |
| 2-methylbutene-1 | 659 | 2,733 | 2,727 | | 6,119 | 6,550 | 3,801 | 2,749 | 278 | | 1,346 | 1,370 | 279 | | |
| Isoprene | 2,541 | 92 | 89 | | 2,722 | 218 | 128 | 90 | | | 36 | | | | |
| n-Pentane | 1,804 | 4,676 | 4,131 | | 10,611 | 10,667 | 6,503 | 4,164 | 420 | | 2,247 | 2,297 | 422 | | |
| t-Pentene-2 | 330 | 4,752 | 3,969 | | 9,051 | 10,609 | 6,609 | 4,001 | 391 | | 2,248 | 2,240 | 393 | 1 | |
| c-Pentene-2 | 330 | 4,582 | 3,746 | | 8,658 | 10,148 | 6,372 | 3,776 | 369 | | 2,159 | 2,143 | 371 | 1 | |
| 2-methylbutene-2 | 330 | 5,841 | 4,544 | | 10,715 | 12,703 | 8,123 | 4,581 | 442 | | 2,724 | 2,674 | 444 | 28 | |
| Cyclopentadiene | 5,637 | 216 | 181 | | 6,034 | 483 | 301 | 182 | | | 84 | | | | |
| t-Piperylene | 1,682 | 65 | 54 | | 1,801 | 144 | 90 | 54 | | | 25 | | | | |
| c-Piperylene | 1,158 | 46 | 35 | | 1,239 | 99 | 64 | 35 | | | 18 | | | | |
| Cyclopentene | 647 | 15,501 | 11,583 | | 27,731 | 33,234 | 21,558 | 11,676 | 1,046 | | 7,103 | 7,116 | 1,052 | 5,914 | 60 |
| Cyclopentane | 414 | 1,261 | 731 | | 2,406 | 2,491 | 1,753 | 737 | 84 | | 577 | 650 | 84 | 26 | 540 |
| $C_6$'s | 359 | 914 | 171 | | 1,444 | 1,443 | 1,271 | 172 | 19 | | 376 | 376 | 19 | | 357 |
| Heavies[1] | | 635 | | | 635 | 918 | 918 | | | | 283 | 285 | | | 285 |
| Total | 17,800 | 45,685 | 57,353 | 514 | 121,352 | 121,352 | 63,570 | 57,784 | 5,631 | 20 | 23,536 | 23,533 | 5,660 | 5,970 | 1,242 |
| BPSD at 60° F | 1,695 | 4,612 | | | 16,750 | | 6,272 | | | | 3,034 | | | 528 | 106 |

[1] Part of heavies may be deposited at Stage 1 reactor and not go into heavy pentane product.

What we claim is:

1. A process for the manufacture of high purity cyclopentene wherein a cyclopentadiene containing hydrocarbon feedstream is selectively hydrogenated at about 1 to 300 p.s.i.g. and an approximate temperature range of 480 to 560° F. over a nickel sulfide on alumina catalyst in the presence of at least one mol of hydrogen per mole of hydrocarbon; separating by distillation a hydrogenation-formed cyclopentene stream containing similar boiling diolefins as impurities; rehydrogenating said separated cyclopentene stream of at least 98 weight percent purity under milder, more selective conditions of approximately the same pressure and catalysts as the first stage and at a lower temperature than the first hydrogenation and below 500° F. thereby transforming the remaining diolefins to monoolefins with minimal cyclopentene to cyclopentane conversion, separating by distillation a cyclopentene stream of at least 99 weight percent purity with a diolefin content of no more than 600 parts per million.

2. A process according to claim 1 wherein the cyclopentadiene containing hydrocarbon feedstream is a debutanized aromatic concentrate, by-product of an ethylene unit.

3. A process according to claim 1 wherein the cyclopentadiene containing hydrocarbon feedstream is a $C_5$ cut from a naphtha cracker.

References Cited

UNITED STATES PATENTS

| 3,251,892 | 5/1966 | Seefelder et al. | 260—666A |
| 3,336,404 | 8/1967 | Chappell | 260—666A |
| 3,400,164 | 9/1968 | McAlister | 260—666A |
| 3,022,359 | 2/1962 | Wiese et al. | 260—666A |
| 3,408,415 | 10/1968 | Dovell | 260—666A |
| 2,793,238 | 5/1957 | Banes | 260—666A |
| 2,887,517 | 5/1959 | Noeske et al. | 260—666A |

DELBERT E. GANTZ, Primary Examiner

V. O'KEEFE, Assistant Examiner